United States Patent
Hasegawa

Patent Number: 5,324,111
Date of Patent: Jun. 28, 1994

[54] STEAM FLOW METER

[75] Inventor: Yoshihiko Hasegawa, Nishiwaki, Japan

[73] Assignee: TLV Co., Ltd., Kakogawa, Japan

[21] Appl. No.: 54,990

[22] Filed: Apr. 29, 1993

[30] Foreign Application Priority Data

May 15, 1992 [JP] Japan .................. 4-148355
May 15, 1992 [JP] Japan .................. 4-148356

[51] Int. Cl.⁵ .................. G01K 13/00; G01N 25/02
[52] U.S. Cl. .................. 374/40; 73/204.11; 73/861.03; 374/143
[58] Field of Search .................. 374/39, 43, 40, 143

[56] References Cited

U.S. PATENT DOCUMENTS

| Re. 33,909 | 5/1992 | Brenner et al. | 374/42 X |
| 1,314,249 | 8/1919 | Crowell, Jr. | 374/42 X |
| 3,918,300 | 11/1975 | Weisstuch et al. | 374/43 X |
| 4,479,727 | 10/1984 | Domingorena et al. | 374/43 |
| 4,651,292 | 3/1987 | Jeenicke et al. | 73/861.03 |
| 4,851,013 | 7/1989 | Luke | 374/39 X |
| 5,083,438 | 1/1992 | McMullin | 374/40 X |
| 5,174,654 | 12/1992 | Droege | 374/43 X |

FOREIGN PATENT DOCUMENTS 3-90823 4/1991 Japan.
4-50620 2/1992 Japan.

Primary Examiner—Daniel M. Yasich
Attorney, Agent, or Firm—Jordan and Hamburg

[57] ABSTRACT

A steam flow meter provided with a steam flow rate detecting device and a steam pressure and temperature detecting device. In order to accurately maintain the heating temperature of the material to be heated without provision of any further measuring device, and detect a change in the efficiency of heat transmission of the steam heating apparatus with a low-priced and simple construction, the flow meter is further provided with a device for detecting the temperature of the material to be heated and an arithmetic unit which connects the material temperature detecting device, the steam flow rate detecting device and the steam pressure and temperature detecting device, whereby the efficiency of the heat transmission of the apparatus to be measured is calculated from the temperature of the material measured by the material temperature detecting device and from the quantity of heat of the steam which has passed through calculated on the basis of the signals from the steam flow rate detecting device and the steam pressure and temperature detecting device.

2 Claims, 2 Drawing Sheets

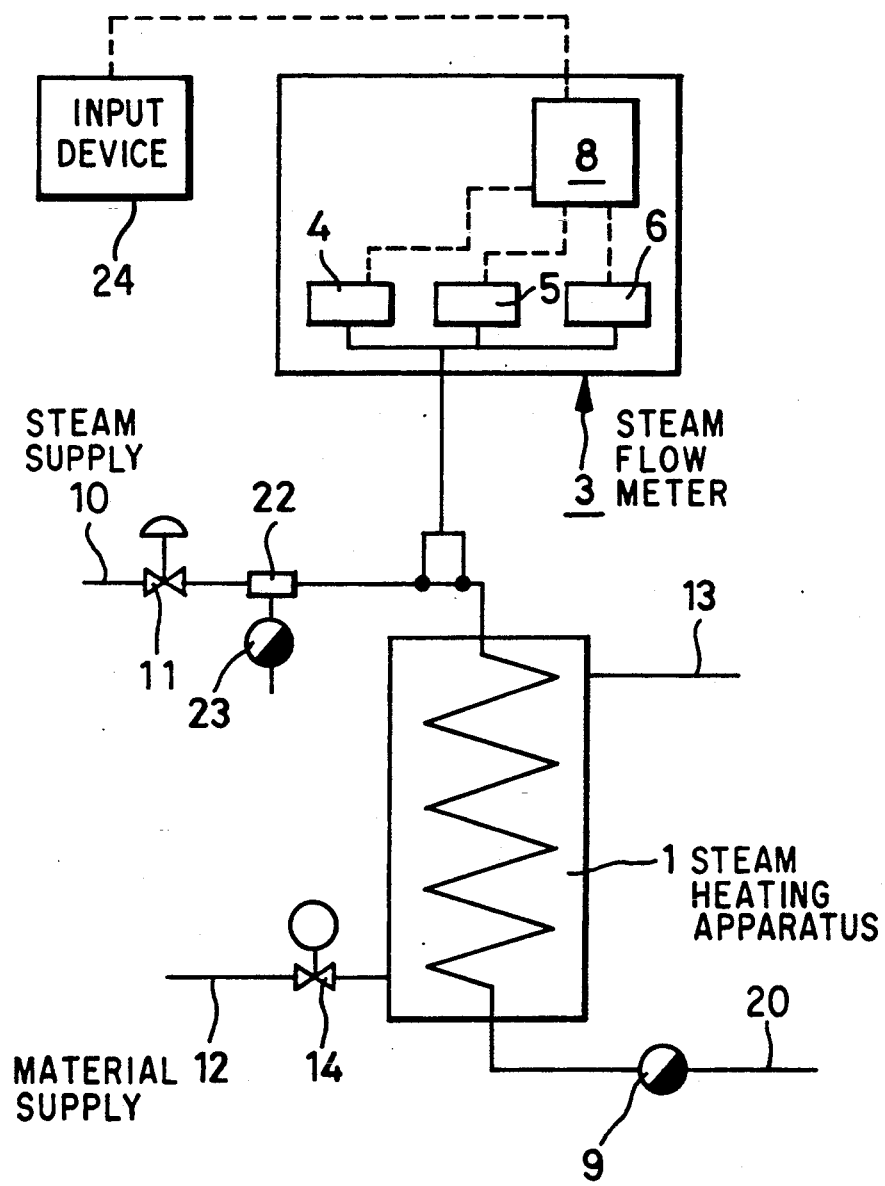

STEAM FLOW METER

BACKGROUND OF THE INVENTION

This invention relates to a steam flow meter for measuring a flow rate of steam which performs heating or drying in various kinds of apparatuses.

A steam heating apparatus is generally provided with a steam flow meter at the inlet side of the apparatus. The flow meters are based on different principles, however, at any rate, each of them allows the amount of steam consumed to be grasped and, at the same time, allows a proper amount of steam for the material to be heated to be supplied to the apparatus. Furthermore, it is important to correctly understand the property of steam in question to supply a proper amount of steam.

In a conventional manner, for example, a corresponding flow rate is determined by measuring a differential pressure to correspond to the steam flowing through a supply tube, and separately the actual temperature and pressure of the steam in question are measured, and in the end, the flow rate to the correct flow rate of the steam is revised on the basis of the measurements of the temperature and pressure. However, since a conventional flow meter based on the measurement of a differential pressure only has a function of measuring an actual differential pressure, in addition to the flow meter, a thermometer and a pressure gauge are provided to carry out a required revision in the case where a correct amount of steam is determined. This increases the cost of equipment and construction. In order to solve such a problem, JP-A Hei-4(1992)-50620 discloses a flow meter which, in addition to measuring the differential pressure of flow rates in the measuring process, simultaneously measures the static pressure and the temperature to carry out the revision of the temperature and pressure of the flow rate in the measuring Process. This provides an added value to the flow meter per se, and at the same time, dispenses with the separate provision of any measuring means or arithmetic correction unit, thereby allowing the reduction in cost of both the equipment and construction to be planned.

Furthermore, separately providing a means for detection of an amount of material to be heated, such as a flow meter or the like, at the supply side of the material to be heated, and grasping the amount of supply of the material to be heated so as to rationalize the amount of supply, are also widely carried out.

For most of the materials to be heated, by such a rationalization of both the amounts of the supply of steam and the material to be heated, the quantity of heat given from the steam is controlled in a predetermined range with respect to the constant amount of material to be heated, so that the degree of heating of the material to be heated is adjusted.

However, there is a problem in that dust, scales, rust and the like contained within the steam adhere to the heating surface of the steam heating apparatus over time, and therefore, the efficiency of heat transmission to the material to be heated is lowered. A large quantity of heat of the steam exceeding a theoretical quantity is required to carry out a required heating, thus lowering the productivity per unit energy. Moreover, in the case where the lowering of the efficiency of heat transmission can not be correctly grasped, unevenness in heat transmission to the material to be heated occurs, resulting in the lowering of the quality of the products.

Depending upon the kinds of materials to be heated, it is required to maintain a heating temperature which changes little and is highly accurate. For example, food stuffs, medical supplies, chemical articles or the like are deteriorated in quality due to changes in temperature during heating, and therefore, prevention of such deterioration is required.

Accordingly, in the steam heating apparatus in the prior art, measurements of the pressure, temperature and flow rate of steam supplied to the steam heating apparatus, and measurements of the temperatures of the material to be heated before and after heating are carried out in order to precisely detect the lowering of the efficiency of heat transmission. That is, a quantity of heat which can be supplied to the material to be heated is calculated from the pressure, temperature and flow rate of the supplied steam, and then the lowering of the efficiency of heat transmission is detected from a rise in the temperature of the material due to the quantity of the supplied heat.

To that end, even if the flow meter disclosed in the above-described JP-A Hei-4(1992)-50620 is used in order to precisely detect the lowering of the efficiency of heat transmission and to maintain the heating temperature of the material more correctly, the separate provision of a thermometer for measuring temperatures before and after heating of the material to be heated is necessary, and furthermore, operations for performing calculations from their measuring data and adjusting the quantity of supply of the steam or material to be heated are indispensable.

In the prior art described above, since it is necessary to separately provide a measuring unit or arithmetic unit in addition to the steam flow meter, there is a problem in that the total expense for the apparatus using steam is increased, and further, the construction of the apparatus becomes complicated.

SUMMARY OF THE INVENTION

It is therefore an object to provide a steam flow meter which is capable of accurately maintaining a heating temperature of the material to be heated without providing any separate measuring units or the like.

It is another object to provide a steam flow meter which is capable of detecting a change in efficiency of heat transmission of a steam heating apparatus at a moderate price and with a simple construction.

In order to is achieve the above-mentioned objects, there is provided a steam flow meter having a steam flow rate detecting means and a steam pressure and temperature detecting means for detecting pressure and temperature of steam. The steam flow meter according to the invention includes: a means for detecting temperature of the material to be heated and an arithmetic unit which connects said material temperature detecting means, said steam flow rate detecting means and said steam pressure and temperature detecting means.

Efficiency of heat transmission of an apparatus to be measured may be calculated from the temperature of said material to be heated measured by said material temperature detecting means and from the quantity of heat of the steam which has passed through calculated on the basis of signals from said steam flow rate detecting means and said steam pressure and temperature detecting means.

The operation of the above-described flow meter is as follows:

The quantity of heat supplied to the steam heating apparatus is calculated from the pressure, temperature and flow rate of steam. Furthermore, the temperature at the inlet and the temperature at the outlet of the apparatus for the material to be heated are detected by the material temperature detecting means. In the case where the amount of supply of the material to be heated is constant, the efficiency of heat transmission can simply be converted by dividing the difference between the temperature at the outlet and the temperature at the inlet of the above-described material to be heated, by the quantity of the supplied heat. Moreover, the efficiency of heat transmission can also be calculated by dividing the quantity of the supplied heat by the value obtained by subtracting the average value of both temperatures of the material to be heated at the outlet and inlet, from the temperature of steam. The regular measurements of the flow rate of steam, and, at the same time, the measurements of change in the efficiency of the heat transmission in the case of a constant amount of supply of the material to be heated, allow the situation where foreign materials attached to the heating surface of the steam heating apparatus or the like can be detected, in other words, the efficiency of the heat transmission of the apparatus in question can always be detected. Accordingly, if cleaning is carried out at a suitable time, the efficiency of the heat transmission of the apparatus can be maintained in a desired range.

Furthermore, the above-described object is also achieved by a steam flow meter having a steam flow rate detecting means and a steam pressure and temperature detecting means for detecting pressure and temperature of steam. The steam flow meter includes a means for inputting a reference quantity of heat and an arithmetic unit which connects said reference heat quantity inputting means, said steam flow rate detecting means and said steam pressure and temperature detecting means.

The quantity of the heat of the steam which has passed through is calculated from signals from said steam flow rate detecting means and said steam pressure and temperature detecting means, and the quantity of heat of the steam and the reference quantity of heat are compared and calculated. By calculating a proportion of the quantity of heat of the steam and the reference quantity of heat, it can be grasped whether the quantity of the heat of the supplied steam is proper or not with the reference quantity of the heat as a reference. At the same time, if, for example, a required quantity of heat in a steam using apparatus in the case where the amount of the material to be heated is a predetermined amount, is selected as a reference quantity of heat, it can be grasped whether the amount of material to be heated exceeds the predetermined amount or not, that is, whether the amount of the supply of the material to be heated is proper or not. Accordingly, the amount of the steam and the amount of the material to be heated can properly be supplied. In addition, change in the efficiency of heat transmission of the apparatus can be measured.

BRIEF DESCRIPTION OF THE DRAWINGS

Other objects and aspects of the invention will become apparent from the following description of embodiments with reference to the accompanying drawings in which:

FIG. 2 is a schematic view of a device for measuring the flow rate of steam using a steam flow meter of another embodiment of the invention.

DETAILED DESCRIPTION OF PREFERRED EMBODIMENT

Figure 1:
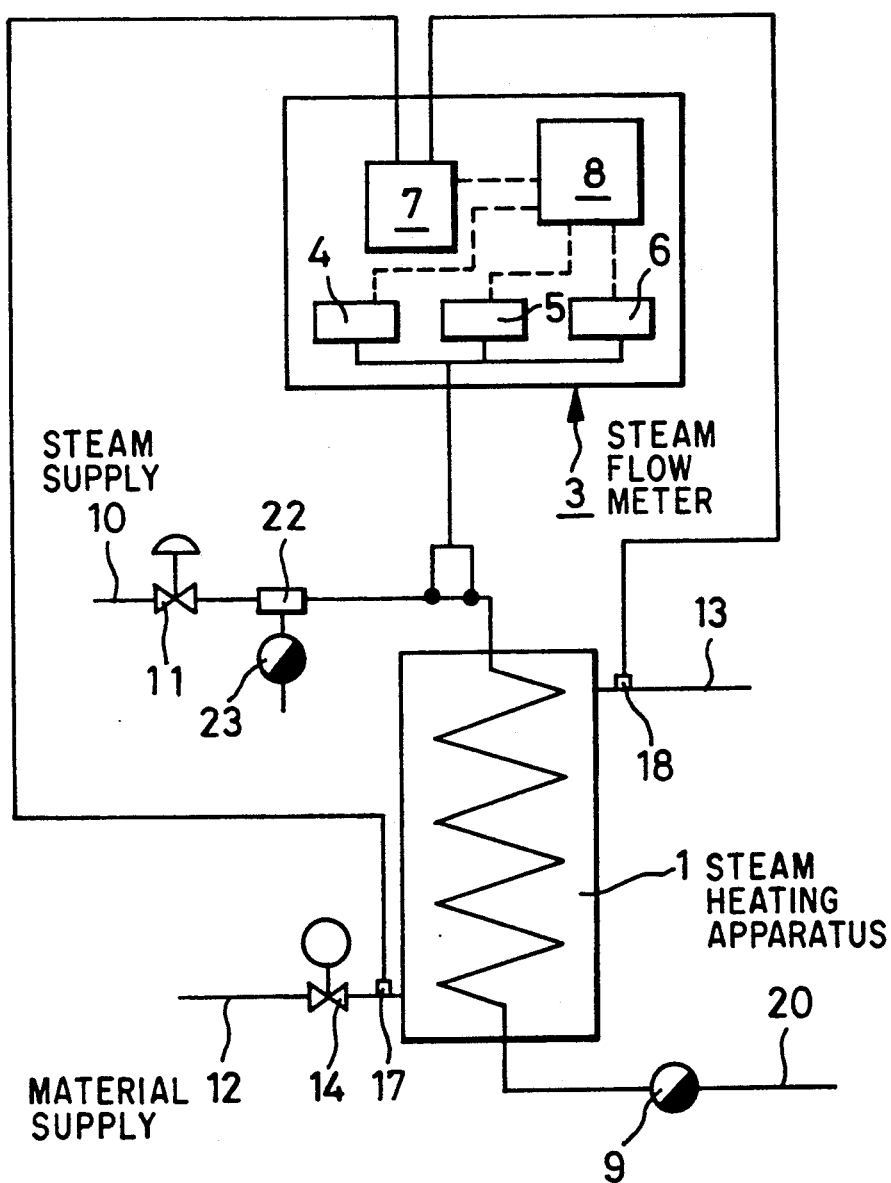
FIG. 1 is a schematic view of a device for measuring the flow rate of the steam passing through a steam heating apparatus using a steam flow meter of an embodiment of the present invention.

Now, the present invention will be explained in detail with reference to the drawings showing embodiments of the invention.

Referring to FIG. 1, which shows an example in which a steam flow meter according to the invention is applied to a steam heating apparatus, a steam supply tube 10 is connected to the steam heating apparatus 1. A steam flow meter 3 is attached to the steam supply tube 10. The steam flow meter 3 is provided with a flow rate measuring part 4, a steam pressure measuring part 5, a steam temperature measuring part 6 and a measuring part 7 of temperature difference of material to be heated. For the flow rate measuring part 4, the constructions of the known flow meters based on any measuring principle may be applied: for example, an orifice plate is disposed in the supply tube 10 and a flow rate of steam may be determined from the pressure difference before and after the orifice plate. Similarly, any widely known, conventional technique may be used for the pressure measuring part 5 and the temperature measuring part 6. The steam flow meter 3 is further provided with an arithmetic unit 8 connected to the flow rate measuring part 4, steam pressure measuring part 5, steam temperature measuring part 6 and measuring part 7 of the temperature difference of the material to be heated.

At the primary side of the steam flow meter 3, there are provided an adjusting valve 11 for adjusting the amount of the supply of steam and a separator 22 for separating steam and condensate within the steam supply tube 10. The separator 22 is provided with a steam trap 23 for discharging the separated condensate out of the system.

At the secondary side of the steam heating apparatus 1, there is connected a condensate discharging tube 20 for discharging the condensate produced in the steam heating apparatus 1 as a result of heat exchange. A steam trap 9 for forcibly discharging the condensate which is flowing downwards is attached to the condensate discharging tube 20; however such a steam trap is not always necessary if the amount of condensate produced within the steam heating apparatus 1 is constant.

A tube 12 for supplying the material to be heated is further connected to the steam heating apparatus 1 together with a valve 14, and similarly, a tube 13 for removing the material to be heated is also connected to the steam heating apparatus 1. A temperature sensor 17 as a means for detecting the temperature of the material at the inlet side is arranged on the material supply tube 12 in the vicinity of the steam heating apparatus 1, and a temperature sensor 18 as a means for detecting the temperature of the material at the outlet side is arranged on the material removing tube 13 in the vicinity of the steam heating apparatus 1. Both the temperature sensors 17 and 18 are connected to the material temperature difference measuring part 7 of the steam flow meter 3.

Now, the operation will be explained.

The material to be heated within the steam heating apparatus 1 is heated by the steam supplied from the steam supply tube 10, and removed by the material removing tube 13. The amount of the supplied steam is measured by the steam flow meter 3. The steam, of which heat is derived by the heating of the material, condenses and is discharged out of the system through the steam trap 9 attached to the secondary side of the steam heating apparatus 1. The respective signals from the flow rate measuring part 4, steam pressure measuring part 5 and steam temperature measuring part 6 in the steam flow meter 3 are inputted into the arithmetic unit 8. In the unit 8, the quantity of the heat of the steam supplied to the steam heating apparatus 1 is calculated from the data of the steam flow rate, steam pressure and temperature. Furthermore, the mean value of the temperatures of the material to be heated at the inlet and outlet sides of the steam heating apparatus 1 or the difference between the temperatures at the inlet and outlet sides, which are detected by the temperature sensors 17 and 18, are derived in the material temperature difference measuring part 7. The arithmetic unit 8 can further simply determine the efficiency of the heat transmission of the steam-heating apparatus 1 from such data. That is, in the case where the amount of the supply of the material to be heated is grasped as a constant value, the efficiency of the heat transmission can be calculated by dividing the temperature difference of the material at the inlet and outlet by the calculated amount of steam, or by dividing the quantity of heat of steam by the value obtained by subtracting the mean value of the temperatures at the inlet and outlet of the material from the measured temperature of the steam. Accordingly, detection of the flow rate of the supplied steam at all times allows changes in the efficiency of the heat transmission to be grasped precisely, and adjustment of the amount of the supply of the steam or the like enables the heating temperature of the material to be maintained accurately. The provision of a control means connected to the arithmetic unit 8 allows the adjustment in question to be automated.

FIG. 2 shows another embodiment, in which a steam flow meter of the construction different from the above-mentioned embodiment is applied to the steam heating apparatus. A steam supply tube 10 is connected to a steam heating apparatus 1. A steam flow meter 3 is attached to the seam supply tube 10. The flow meter 3 is provided with a flow rate measuring part 4, steam pressure measuring part 5, steam temperature measuring part 6 and arithmetic unit 8. The arithmetic unit 8 is connected to the flow rate measuring part 4, steam pressure measuring part 5 and steam temperature measuring part 6, and further connected to a means for inputting a reference quantity of heat 24. For example, this means corresponds to one or more keys in a keyboard for inputting data of a reference quantity of heat with numerical values.

In the construction of the present embodiment, the flow rate measuring part 4, steam temperature measuring part 5, steam pressure measuring part 6 in the flow meter 3, and the adjusting valves 11, 14, steam traps 9, 23 and the like are fundamentally the same as the above-mentioned embodiment, for example, the construction of a differential pressure type measuring system of flow meter is preferable for the flow rate measuring part 4. The parts which are common with the above mentioned-embodiment are affixed with the same reference numerals and the explanation of the construction thereof is omitted.

The operation of the present embodiment is as follows:

The material to be heated within the steam heating apparatus 1 is heated by the steam supplied from the steam supply tube 10, and is removed by the material removing tube 13. The amount of supplied steam is measured by the steam flow meter 3. The respective signals from the flow rate measuring part 4, steam pressure measuring part 5 and steam temperature measuring part 6 are input into the arithmetic unit 8, in which the quantity of heat of the steam supplied to the steam heating apparatus 1 is calculated from the data of the flow rate, temperature and pressure of the steam. The proportion of the quantity of heat of the supplied steam with the reference quantity of heat is calculated by dividing the calculated quantity of heat of the steam in question by the data of the reference quantity of heat inputted from a reference heat quantity inputting means 24 which is connected to the arithmetic unit 8. It can be grasped from the result whether the quantity of heat of the steam actually supplied is less or larger than the reference quantity of heat, or is a proper value. In addition, if the quantity of the heat required in the case where the amount of the material to be heated is a predetermined amount, that is, the designed quantity of heat determined when the apparatus was designed, is selected as a reference quantity of heat, changes in the efficiency of the heat transmission can be grasped from the comparison of the calculated quantity of heat of the steam with the designed quantity of heat. Moreover, from the above-mentioned comparison, it is possible to theoretically grasp whether the amount of the material to be heated is larger or smaller, and adjustment of the valve 14 in the material supply tube 12 allows the amount of the material to be adjusted. Accordingly, the degree of heating against the material to be heated can be adjusted by grasping the quantity of heat of the supplied steam and the amount of the material to be heated only by the steam flow meter 3 and adjusting them.

What is claimed is:

1. A steam flow meter having a steam flow rate detecting means and a steam pressure and temperature detecting means for detecting pressure and temperature of steam, further comprising:

a means for inputting a reference quantity of heat;

said steam flow rate detecting means and said steam pressure and temperature detecting means being operatively connected and being capable of producing signals; and an arithmetic unit being operatively connected to said reference heat quantity inputting means, said steam flow rate detecting means and said steam pressure and temperature detecting means, said arithmetic unit being capable of calculating a quantity of heat of an amount of steam which has passed through an apparatus from signals received from said steam flow rate detecting means and said steam pressure and temperature detecting means, said quantity of heat of the steam and said reference quantity of heat are compared and calculated.

2. A steam flow meter having a steam flow rate detecting means and a steam pressure and temperature detecting means for detecting pressure and temperature of steam, said steam flow meter further comprising:

a means for detecting temperature of a material to be heated;

said steam flow rate detecting means and said steam pressure and temperature detecting means being operatively connected and being capable of producing signals; and an arithmetic unit being operatively connected to said material temperature detecting means and receiving said signals from said steam flow rate detecting means and said steam pressure and temperature detecting means, said arithmetic unit being capable of calculating an efficiency of the heat transmission of an apparatus to be measured from a temperature detected by said material temperature detecting means and from a quantity of heat of an amount of steam which has passed through the apparatus, the quantity of heat of the steam being calculated from the signals received from said steam flow rate detecting means and said steam pressure and temperature detecting means.

* * * * *